No. 879,918. PATENTED FEB. 25, 1908.
W. S. SHERMAN.
BORING MACHINE.
APPLICATION FILED MAR. 22, 1907.

2 SHEETS—SHEET 1.

Witnesses.
Inventor.
Willis S. Sherman.
By Benedict, Morsell & Caldwell
Attorneys.

No. 879,918. PATENTED FEB. 25, 1908.
W. S. SHERMAN.
BORING MACHINE.
APPLICATION FILED MAR. 22, 1907.

2 SHEETS—SHEET 2.

Witnesses:
Inventor.
Willis S. Sherman.
By Benedict, Morsell & Caldwell
Attorneys.

UNITED STATES PATENT OFFICE.

WILLIS S. SHERMAN, OF MILWAUKEE, WISCONSIN.

BORING-MACHINE.

No. 879,918.  Specification of Letters Patent.  Patented Feb. 25, 1908.

Application filed March 22, 1907. Serial No. 363,854.

*To all whom it may concern:*

Be it known that I, WILLIS S. SHERMAN, residing in Milwaukee, in the county of Milwaukee and State of Wisconsin, have invented new and useful Improvements in Boring-Machines, of which the following is a description, reference being had to the accompanying drawings, which are a part of this specification.

This invention has for its object to provide a boring machine especially adapted for use in boring nail holes in the side faces of flooring, but capable of other applications.

Another object of this invention is to provide a boring machine of such a construction as to be capable of thorough lubrication of all of its working parts in a manner that will not require the frequent attention of the operator.

Another object of the invention is to improve upon the construction and arrangement of the driving mechanism for boring machines of this character.

Another object of this invention is to provide means independent of the driving belt for holding the drill head against the work yieldingly and with pressure and for conveniently adjusting the position of the drill head when not engaged by the work.

Another object of the invention is to improve upon details of construction of the drill head for rendering its parts more durable and efficient in operation and less liable to wear and become out of order.

With the above and other objects in view the invention consists in the boring machine herein claimed, its parts and combinations of parts and all equivalents.

Figure 1:
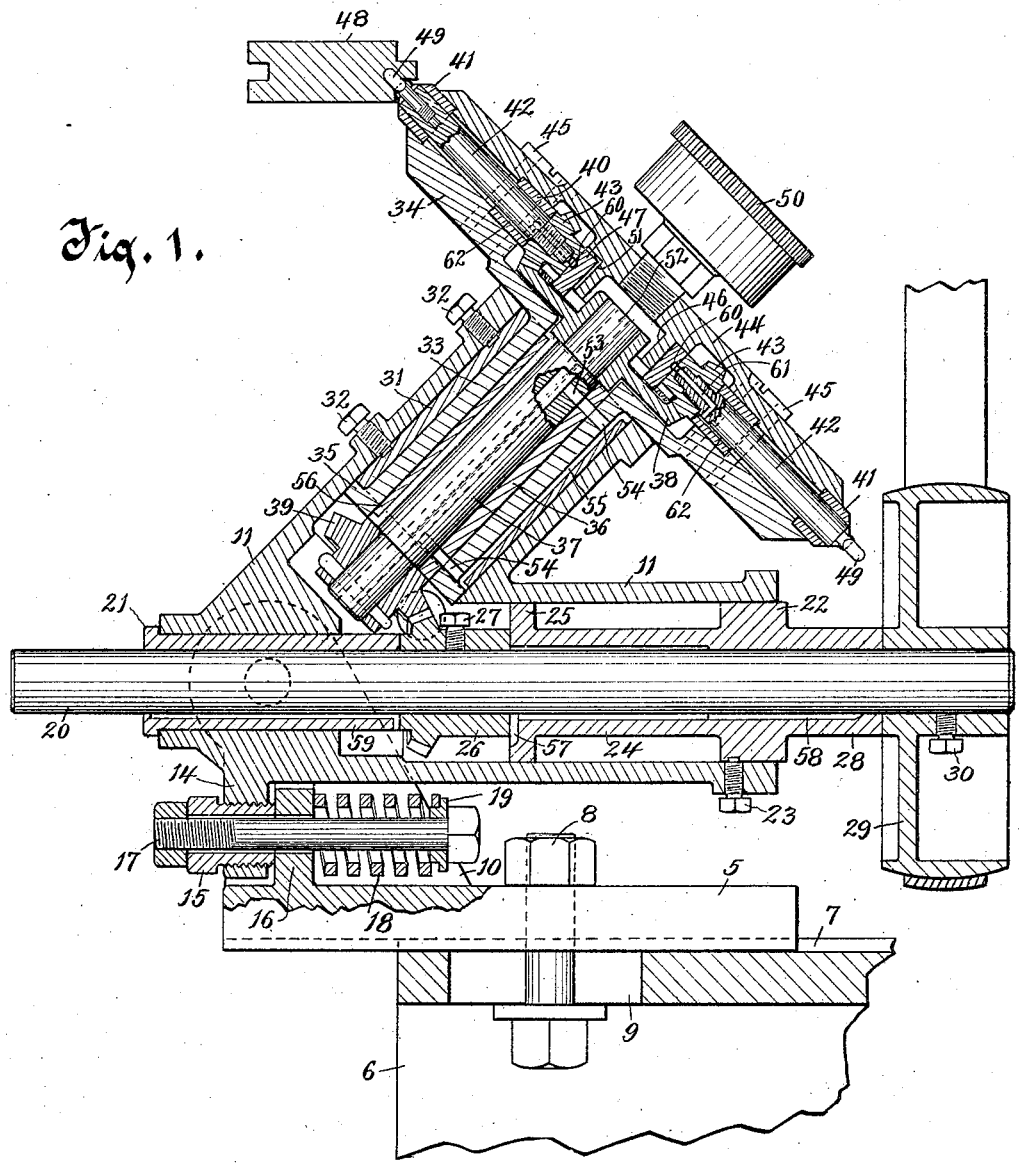
Figure 2:
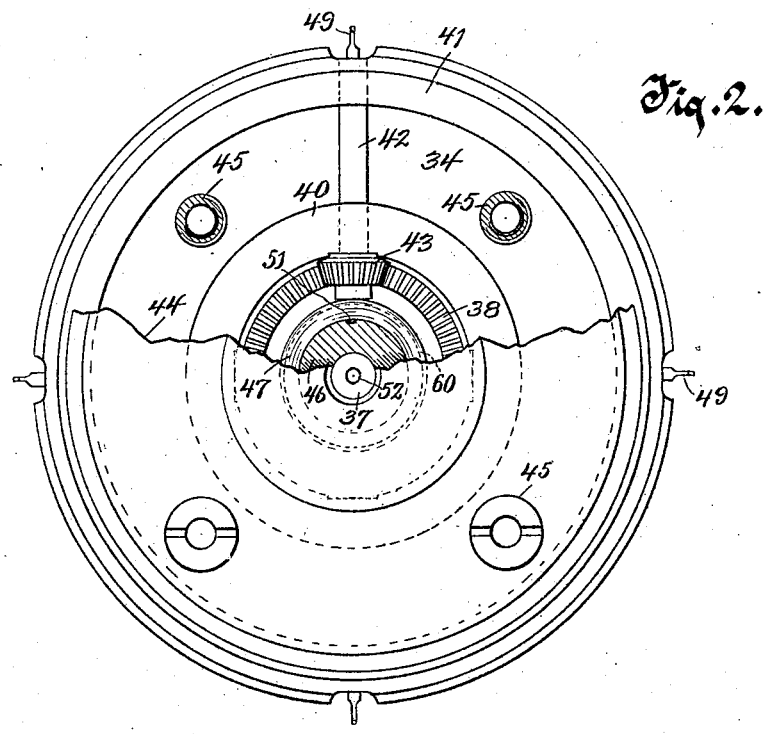
Figure 3:
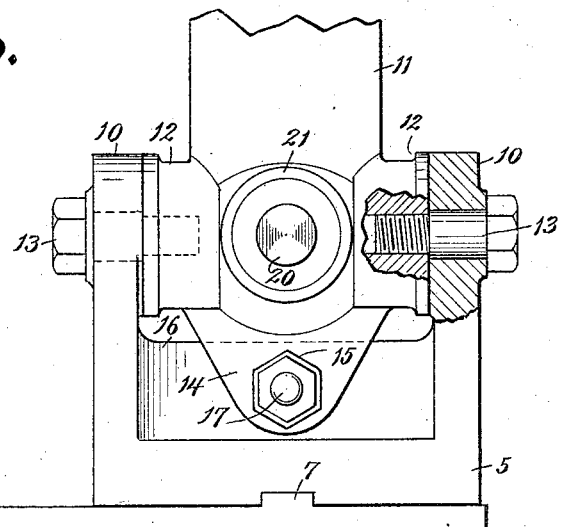

Referring to the accompanying drawings in which like characters of reference indicate the same parts in the several views; Figure 1 is a central sectional view of a boring machine constructed in accordance with this invention; Fig. 2 is an end elevation of the drill head with parts broken away and sectioned for clearness of illustration; and, Fig. 3 is an end elevation of the trunnion connection between the casing and the base.

In these drawings 5 represents a base which is adjustably mounted on a supporting bracket 6 adapted for connection to any suitable support, such as a matching machine for making flooring, there being a guide rib 7 on the face of the bracket riding in a corresponding groove in the bottom of the base and bolts 8 clamping the base to the bracket in such a manner as to permit of its adjustment thereon by reason of said bolts passing through elongated slots 9 of the bracket.

At one end the base 5 is provided with a pair of upwardly extending ears 10 forming trunnion bearings for an angular tubular casing 11, the casing being provided with laterally extending bosses 12 on opposite sides of its elbow portion into which are threaded trunnion screws 13 loosely passing through the trunnion bearings 10. In this manner the casing 11 is free to swing upon its trunnion bearings and is limited in so doing and given a tendency to remain in one position with pressure by means of an adjustable spring actuated stop therebeneath. A lug 14 projects downwardly from the elbow portion of the casing and has a bushing 15 adjustably threaded therein to strike against a lug or web 16 extending up from the base between the two trunnion bearings. A bolt 17 passes through the bushing 15 and an opening in the web 16 with a coil spring 18 mounted thereon and bearing on the web opposite the bushing 15 and on a collar 19 of the bolt. When the angular casing is swung downwardly on its trunnions the lug 14 is moved away from the web 16 causing the spring 18 to be compressed by the bolt, said spring exerting its pressure in such a way as to tend to restore the casing to its normal position with the bushing engaging the web 16. The compression of the spring may be adjusted by tightening the nut on bolt 17.

The lower tubular member of the angular casing 11 has a drive shaft 20 journaled therethrough, there being a bushing 21 surrounding the shaft and tightly fitting in the elbow portion of the casing and a bushing 22 fitting in the other end of this member of the casing where the bore is considerably larger. The bushing 22 is held in place by a set screw 23 and has a sleeve portion 24 out of contact with the shaft 20 and serving to space the enlarged portion of the bushing which is held by the set screw from a bearing flange 25 which serves as a thrust bearing for a beveled pinion 26 locked to the shaft 20 by a set screw 27 and confined between the bearing flange 25 and the end of bushing 21. The bearing flange 25 fits the bore of the lower member of the casing and an extension 28 of the bushing serves as a guide for a belt pulley 29 locked on the drive shaft 20 by a set screw 30. With this construction the shaft 20 with the bushing 22 and the pinion 26 may be removed from the casing by loosening the set screw 23 so that the parts may be accessible for cleaning or repair.

The upper tubular member of the casing 11 receives a removable bushing 31 which is held in place by a pair of set screws 32 and which is formed of a pair of semi-cylindrical members confined in place upon the tubular sleeve 33 of a drill head 34 by engaging said drill head at one end and an annular flange 35 on the sleeve at the other end. The sleeve 33 has an internal tubular bushing 36 tightly fitting therein and receiving a spindle shaft 37 which has a beveled gear 38 fitted on its upper end and bearing on the bushing and a beveled pinion 39 keyed on its lower end and also bearing on the bushing and meshing with the beveled pinion 26 of the drive shaft. This construction enables the drill head with the shaft 37 and its pinion and the bushings being readily removed from the upper tubular member of the casing by loosening the set screws 32 and drawing them therefrom, permitting the parts to be easily reached for cleaning or repair.

The beveled gear 38 is contained within a recess of the drill head and concentric therewith are a pair of rings 40 and 41 set into the face of the drill head 34 so as to be held in place by shoulders thereof and forming bearings for a series of radial spindles 42 which pass therethrough and have beveled pinions 43 threaded on their inner ends and meshing with the beveled gear 38. A cover plate 44 is clamped upon the rings 40 and 41, by means of hollow screws 45 threading into the drill head, there being annular shoulders on said cover plate fitting against said rings, and annular shoulders on the drill head also fitting against said rings. The cover plate has an annular flange 46 surrounding the hub of beveled gear 38 affording a seat or bearing for a hardened bearing ring 47 which is free to turn thereon and upon which the hubs of the pinions 43 bear to take the end thrust of the spindles 42, said pinions bearing at their opposite ends upon the ring 40. The outer ring 41 is beveled on both sides of its outer edge so as to form an angular rim for the drill head adapted to ride in the rabbet beneath the tongue of a strip of flooring 48 which is driven in any desirable manner, preferably by a matching machine to which the present invention is designed to be attached. Drills 49 are threaded in the outer ends of spindles 42 so as to bore into the flooring strips at an angle, as shown in Fig. 1, as they are successively brought into engagement therewith by the turning of the drill head by reason of its engagement with the moving strip of flooring.

The entire apparatus is supplied with lubricant from a grease cup 50 which is threaded to the center of the cover plate 44, the lubricant therefrom passing into the gearing chamber of the drill head and lubricating the gearings and the thrust bearings therein and passing through a groove 51 of the flange 46 to lubricate the ring 47 and through an annular groove 60 on the outside ring 47 into passageways 61 leading through the pinions 43 and the spindles 42 to grooves 62 in the rings 40 from which it passes into the space between rings 40 and 41 so as to lubricate the outer bearings of the spindles. The lubricant also finds its way through a central bore 52 of shaft 37 to the interior of the elbow portion of the casing 11 where pinions 26 and 39 and their bearings are lubricated. From the passageway 52 of the shaft 37 are laterally extending ports 53 passing through said shaft and coming into register with passageways 54 through the surrounding bushing 36 and the sleeve member 33 of the drill head to a longitudinal groove 55 on the inner surface of the bushing 31 to facilitate the free turning of the drill head. The shaft 37 receives lubricant around it not only from the ports 53, but through a longitudinal groove 56 on the interior of bushing 36 which receives lubricant from the gear chamber of the drill head and conveys it to the thrust bearing of pinion 39. It will be understood that the casing is filled with lubricant in those parts containing gearing so that lubricant will find its way past the pinion 26 through a groove 57 of the bearing flange 25 to the interior of the loose sleeve 24 and then through a groove 58 to the bearing in bushing 22 for the drive shaft 20. Lubricant also finds its way past pinion 26 through a groove 59 of bushing 21 so as to lubricate its bearing for the drive shaft.

From the foregoing it will be understood that in operation the driving shaft 20 is driven by means of a belt on its drive pulley 29 in any desirable manner and in rotating it causes the beveled pinion 26 thereon to drive the spindle shaft 37 by meshing with its beveled pinion 39, thus causing the spindles 42 to rotate at a high speed through the connection of their beveled pinions 43 with the beveled gear 38, so that when the drill head is rotated by the movements of the flooring strip against which it bears the drills 49 will be successively brought into engagement therewith and cut the nail holes as desired.

The drill head is held firmly against the flooring strip at all times by the action of spring 18 and when one strip of flooring has passed therefrom it is limited in its position by the engagement of the bushing 15 with the web 16 so as to be in proper position to receive the next strip as it is fed thereto from the matching machine. The boring may be done from above when desired by removing the driving pulley 29 and placing it on the other end of the drive shaft 20, so that the strips of flooring may be fed beneath the drill head instead of above it as shown.

With this invention all of the parts are readily accessible, the drill members 49 being removed and replaced when worn by simply threading them out of the spindles, and it being only necessary to remove the plate 44 to expose all of the spindles to view and to replace any parts contained in the drill head. The spindles may be unscrewed from their pinions 43 if it is desired to replace any of them and by loosening the set screws 32 the shaft 37 with its pinion 39 and all of the surrounding parts may be withdrawn from the casing and dissembled by removing the key from the pinion 39. Similarly the shaft 20 and its parts may be removed from the casing by loosening the set screw 23 as before mentioned.

By providing the drive shaft separate from and at an angle to the spindle shaft 37 the machine may be belted directly instead of necessitating the use of corner pulleys and may be belted from above or below and on either side of the machine. This arrangement also permits of the possibility of a complete and thorough lubrication of all operating parts without an unnecessary waste of lubricant.

The loose ring 47 is free to turn by the influence of the gear 38 thereon so as to constantly change the bearing surfaces for the pinions 43 and prevent its being worn thereby, the lubricant groove 60 thereof assuring a thorough lubrication of these bearing parts as well as serving to feed the lubricant to the passages 61 from which it is conveyed to the spindle bearings.

What I claim as my invention is;

1. A boring machine, comprising a pivotally mounted casing, a drive shaft journaled therein, a drill head rotatably mounted in the casing at an angle to the drive shaft, and a spindle shaft for the drill head geared to the drive shaft.

2. A boring machine, comprising a base having trunnion bearings, a casing pivotally mounted in the trunnion bearings, a drill head rotatably mounted in the casing, a spindle shaft for operating the drills of the drill head, means for turning the spindle shaft, a lug on the casing, a bushing adjustably threaded therein, a stop on the base adapted to be engaged by the bushing, a bolt passing through the bushing and an opening of the stop, and a coil spring surrounding the bolt and bearing on the stop to hold the bushing in engagement with the stop.

3. A boring machine, comprising a pivotally mounted casing, a drill head rotatably mounted therein, a spindle shaft for driving the drills of the drill head, a pinion mounted thereon, a driving shaft journaled in the casing at an angle to the spindle shaft, a pinion on the driving shaft meshing with the pinion on the spindle shaft, and a bushing on the driving shaft removably mounted in the casing for permitting the driving shaft and its pinion to be withdrawn without interfering with the drill head and the spindle shaft.

4. A boring machine, comprising a pivotally mounted casing, a driving shaft journaled therein, a drill head rotatably mounted in the casing at an angle to the driving shaft, a spindle shaft for driving the drills of the drill head, intermeshing pinions on the spindle shaft and the driving shaft, and a bushing surrounding the spindle shaft and removably mounted in the casing, whereby the drill head and the spindle shaft with its pinion may be withdrawn from the casing without interfering with the driving shaft.

5. In a boring machine, a drill head comprising a rotatably mounted disk like member, a pair of concentric rings mounted thereon, a cover plate secured to the disk like member and clamping the rings therebetween, drill spindles journaled in the rings, drill members on the outer ends of the spindles, pinions on the inner ends of the spindles, and a suitably driven gear meshing with the pinions.

6. In a boring machine, a drill head comprising a rotatably mounted disk like member, a pair of concentric rings mounted thereon, a cover plate secured to the disk like member and clamping the rings therebetween, spindles journaled in the rings, drill members on the outer ends of the spindles, pinions on the inner ends of the spindles, a suitably driven gear meshing with the pinions, and means carried by the cover against which the pinions abut to take the end thrust of the spindles.

7. In a boring machine, a drill head comprising a rotatably mounted disk like member, a pair of concentric rings mounted thereon, a cover plate secured to the disk like member, spindles journaled in the rings, drill members on the outer ends of the spindles, pinions on the inner ends of the spindles, a suitably driven gear meshing with the pinions, and a ring mounted on the cover against which the pinions bear to take up the end thrust of the spindles.

8. A boring machine, comprising a pivotally mounted casing, a drill head member having a flanged sleeve rotatably mounted in the casing, a bushing formed in sections surrounding the flanged sleeve and releasably secured in the casing as a bearing for the sleeve, a bushing within the sleeve, a spindle shaft passing therethrough, a beveled gear on the end of the spindle shaft, a pair of rings mounted on the head member, a cover plate secured to the head member and clamping the rings therebetween, spindles journaled through the rings, drill members on the outer ends of the spindles, pinions on the inner ends of the spindles meshing with the beveled gear, a bearing ring on the cover plate engaged by the pinions for taking the end thrust of the spindles, and a lubricant cup secured to the cover plate and discharging into the gear chamber between the cover plate and the head member, there being openings in the inner ring to permit the lubricant to pass to the space between the rings for lubricating the spindles, and a longitudinal bore through the spindle shaft communicating with ports leading through the bushing surrounding said shaft and through the sleeve of the head member for lubricating the said sleeve, and a groove in the bushing surrounding the spindle shaft leading from the gear chamber to lubricate the said spindle shaft, and means for driving the spindle shaft supplied with lubricant from the bore of the spindle shaft.

9. A boring machine, comprising a pivotally mounted casing, a drill head rotatably mounted therein, a spindle shaft for driving the drill members of the drill head, means for lubricating the spindle shaft and the drill head, a driving shaft journaled in the casing, intermeshing gearing on the driving shaft and the spindle shaft receiving such lubricant, a bushing between the driving shaft and the casing at one end provided with a groove for supplying the lubricant thereto, and another bushing between the driving shaft and the casing at the other end having a loose sleeve surrounding the driving shaft with a bearing flange on its end to engage the end of the pinion of the driving shaft and form an end wall for the lubricant chamber containing the intermeshing gearing, there being a groove in the bushing leading from the interior of the sleeve and in the bearing flange to convey lubricant to said bushing.

10. In a boring machine, a drill head comprising a rotatably mounted head member, radial spindles carried by the head member, drill members on the outer ends of the spindles, pinions on the inner ends of the spindles, a suitable driving gear meshing with the pinions, and a loosely mounted ring against which the pinions bear to take up the end thrust of the spindles.

11. In a boring machine, a drill head comprising a rotatably mounted head member, a cover plate secured to the head member and provided with a flange, radial spindles carried by the head member, drill members on the outer ends of the spindles, pinions on the inner ends of the spindles, a suitably driven gear meshing with the pinions, and a ring loosely mounted on the flange of the cover forming a bearing for the pinions to take the end thrust of the spindles.

12. In a boring machine, a drill head comprising a rotatably mounted disk like member, a pair of concentric rings mounted thereon, a cover plate secured to the disk like member and clamping the rings therebetween, there being an annular flange on the coverplate, spindles journaled in the rings, drill members on the outer ends of the spindles, pinions on the inner ends of the spindles, a suitably driven gear meshing with the pinions, a ring loosely mounted on the flange of the cover plate and forming a bearing for the pinions to take the end thrust of the spindles, and a grease cup for lubricating the gearing and the bearings, there being a groove in the flange for conducting lubricant between the loose ring and the flange and a groove on the loose ring for conducting lubricant between the pinions and the loose ring and passages leading through the pinions and the spindles to grooves in the inner ring by which the inner bearings of the spindles are lubricated and lubricant is conducted to the space between the two rings to lubricate the outer bearings of the spindles.

13. In a boring machine, a drill head comprising a rotatably mounted head member, radial spindles carried by the head member, drill members on the outer ends of the spindles, pinions on the inner ends of the spindles a suitable driving gear meshing with the pinions, and a loosely mounted ring against which the pinions bear to take up the end thrust of the spindles adapted to receive motion from the driving gear.

14. In a boring machine, a drill head comprising a rotatably mounted head member, radial spindles carried by the head member, drill members on the outer ends of the spindles, pinions on the inner ends of the spindles, a suitable driving gear meshing with the pinions, and a loosely mounted ring against which the pinions bear to take up the end thrust of the spindles, said ring being so positioned with relation to the driving gear as to receive motion therefrom.

15. In a boring machine, a drill head comprising a rotatably mounted head member, radial spindles carried by the head member, drill members on the outer ends of the spindles, pinions mounted on the spindles, a suitable driving gear meshing with the pinions, and a ring for taking the end thrust of the spindles adapted to receive motion from the driving gear.

16. In a boring machine, a drill head comprising a rotatably mounted head member, radial spindles carried by the head member, drill members on the outer ends of the spindles, pinions mounted on the spindles, a suitable driving gear meshing with the pinions, and a loosely mounted ring taking the end thrust of the spindles and so positioned with relation to the driving gear as to receive motion therefrom.

17. In a boring machine, a drill head comprising a rotatably mounted head member, radial spindles journaled in the head member, drill members on the outer ends of the spindles, pinions mounted on the spindles, a suitable driving gear meshing with the pinions, a ring for taking the end thrust of the spindles, a cover for the head member, and means for supplying lubricant to the space between the cover and the head member, there being a groove in the ring and passages leading from the groove to the bearings of the spindles.

In testimony whereof, I affix my signature, in presence of two witnesses.

WILLIS S. SHERMAN.

Witnesses:
K. S. C. CALDWELL,
ANNA F. SCHMIDTBAUER.